United States Patent [19]

Benzel et al.

[11] Patent Number: 5,745,628
[45] Date of Patent: Apr. 28, 1998

[54] METHOD AND APPARATUS FOR IDENTIFYING A REGION OF AN S-Z STRANDED CABLE CORE AND FOR MARKING AN OUTER SHEATH COVERING THE S-Z STRANDED CABLE CORE TO INDICATE A REGION THEREUNDER

[75] Inventors: David John Benzel, Neuilly sur Seine, France; John R. Johnsen, Hickory, N.C.

[73] Assignee: Alcatel NA Cable Systems, Inc., Claremont, N.C.

[21] Appl. No.: 782,950

[22] Filed: Jan. 13, 1997

[51] Int. Cl.[6] .............. G02B 6/44; B32B 31/00; H01B 7/36
[52] U.S. Cl. .............. 385/104; 385/100; 385/111; 156/64; 174/112; 174/115
[58] Field of Search .............. 385/100–105, 385/109–114; 156/51, 64; 174/112, 113 R, 115, 117 F, 34, 36

[56] References Cited

U.S. PATENT DOCUMENTS

| 3,197,554 | 7/1965 | Baker | 174/112 |
|---|---|---|---|
| 4,543,448 | 9/1985 | Deurloo | 174/112 |
| 4,565,591 | 1/1986 | Shannon | 156/51 |
| 4,659,424 | 4/1987 | Baxter et al. | 156/51 |
| 4,746,190 | 5/1988 | Oestreich et al. | 385/112 |
| 4,828,352 | 5/1989 | Kraft | 385/109 |
| 4,837,405 | 6/1989 | Bonjour et al. | 174/36 |
| 4,880,484 | 11/1989 | Obermeier et al. | 156/51 |
| 5,485,745 | 1/1996 | Rademaker et al. | 385/94 |

FOREIGN PATENT DOCUMENTS

| 0484536 | 2/1991 | European Pat. Off. . |
| 1465975 | 5/1969 | Germany . |
| 46-38748 | 11/1971 | Japan . |

*Primary Examiner*—Rodney B. Bovernick
*Assistant Examiner*—Hemang Sanghav
*Attorney, Agent, or Firm*—Ware, Fressola, Van Der Sluys & Adolphson LLP

[57] ABSTRACT

A process and apparatus for marking an outer jacket of an S-Z stranded cable to indicate the locations of switchbacks thereunder. The process comprises passing a portion of a cable core within a field of view of an imaging means to acquire an image thereof. The quantity of visually distinguishable conductors in the acquired image is compared to a reference value. If the reference value is exceeded, a transition region or switchback is indicated. Once a transition region is indicated, its position is tracked through a outer jacketing step. A marking to indication the location of the transition region is applied to the outer jacket according to the tracked position of the transition region.

14 Claims, 4 Drawing Sheets

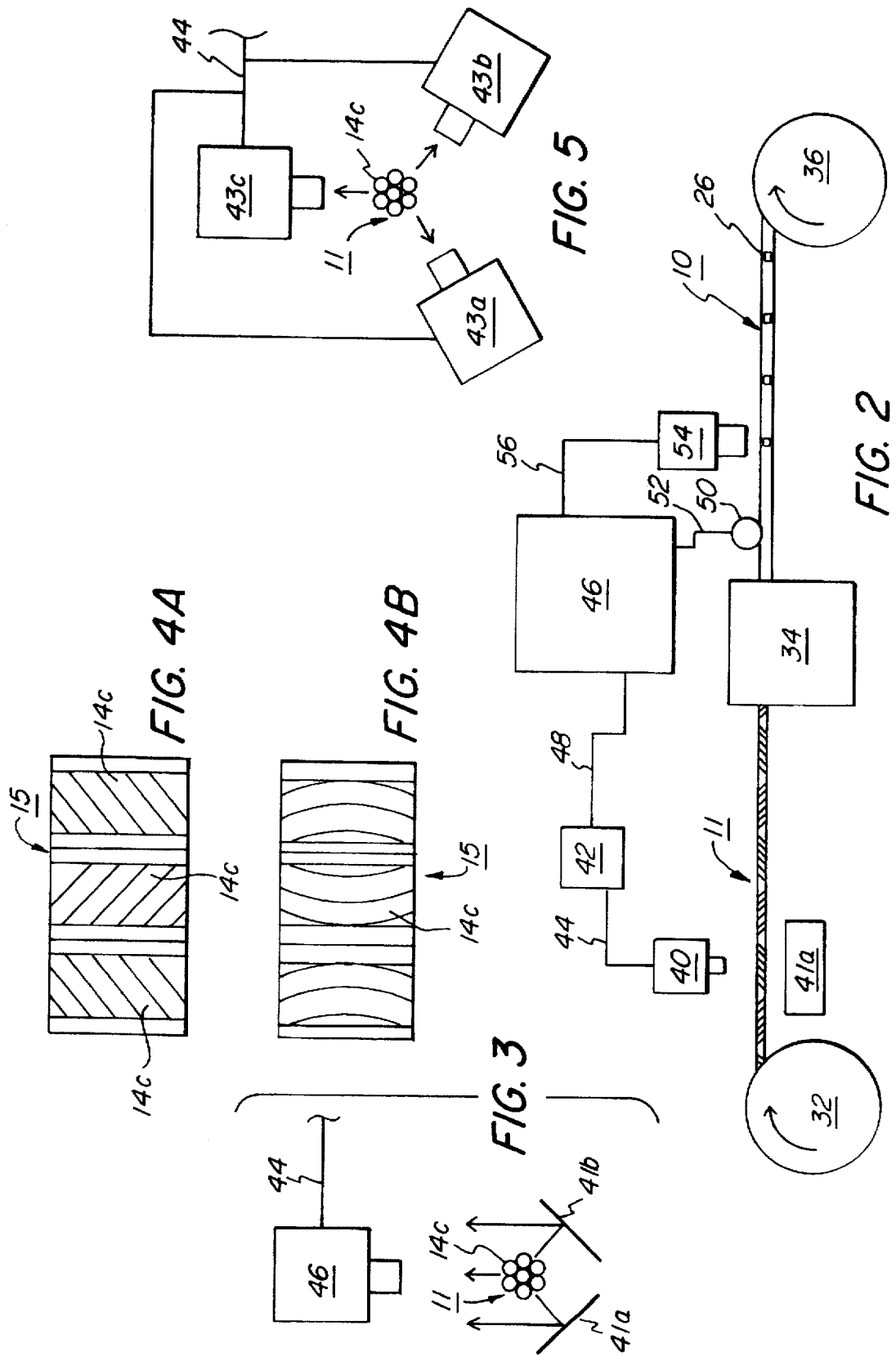

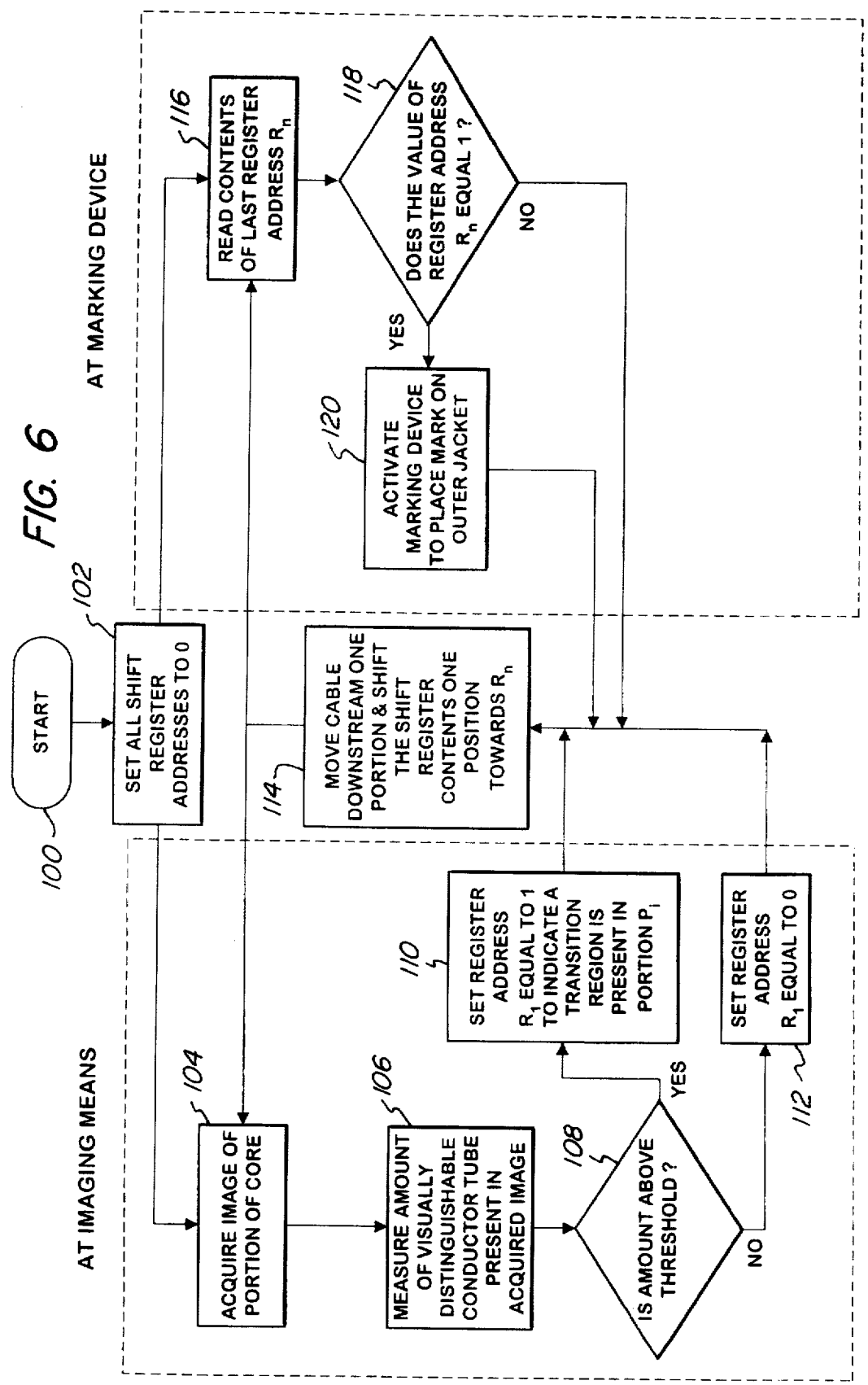

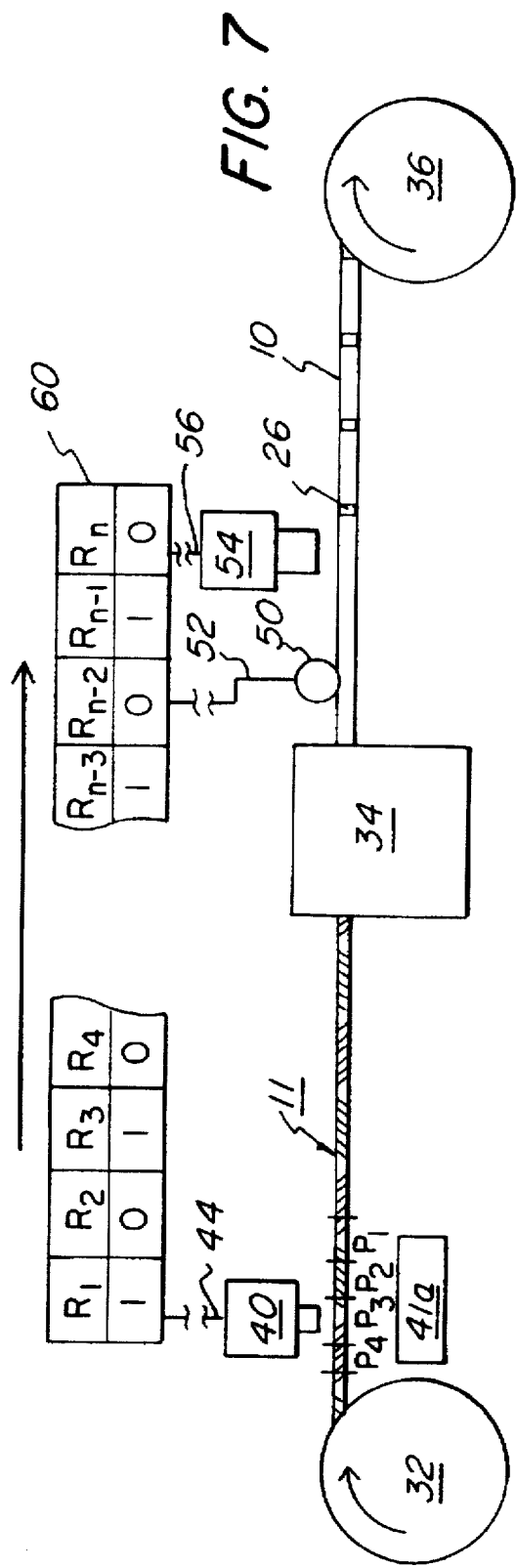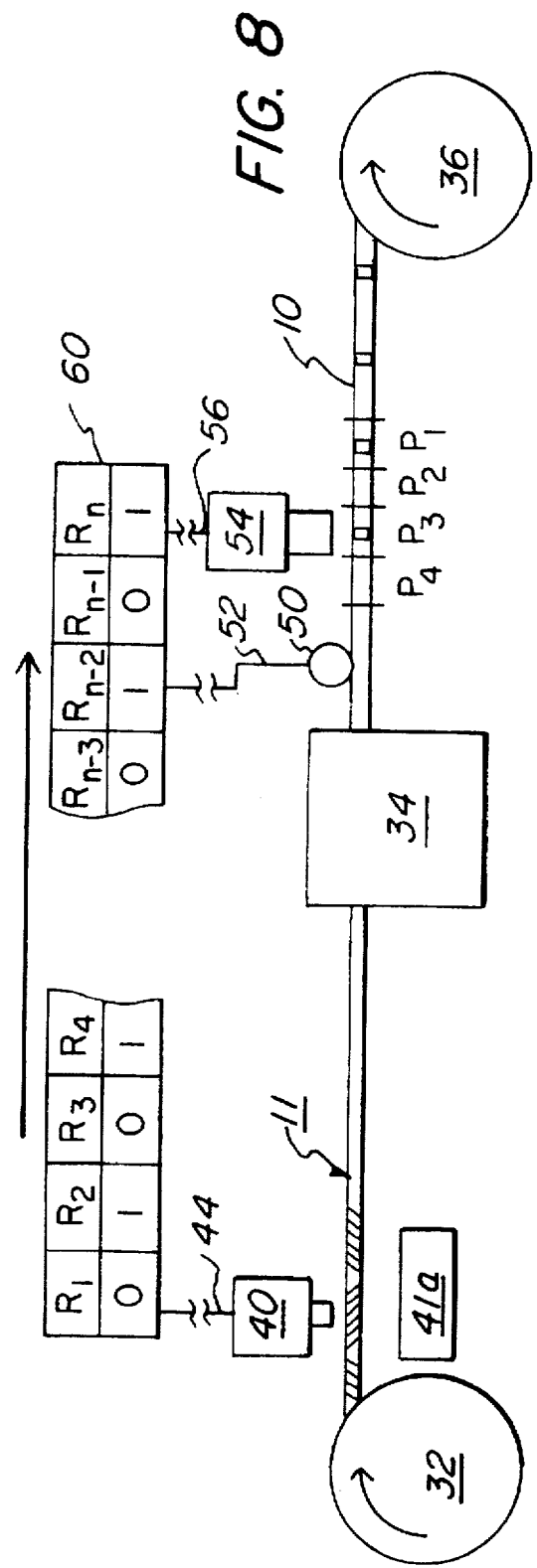

METHOD AND APPARATUS FOR IDENTIFYING A REGION OF AN S-Z STRANDED CABLE CORE AND FOR MARKING AN OUTER SHEATH COVERING THE S-Z STRANDED CABLE CORE TO INDICATE A REGION THEREUNDER

BACKGROUND OF THE INVENTION

1. Field of the Invention

The present invention generally relates to the field of manufacturing optical fiber communication cables. More particularly, the present invention relates to a method and apparatus for identifying the location of reverse oscillating lay switchbacks on S-Z stranded cable cores prior to extrusion of an outer jacket there over and for further providing a marking on the outer jacket to indicate the location of the switchbacks thereunder.

2. Description of the Prior Art

Reverse oscillating lay (ROL) optical fiber cables, sometimes referred to as S-Z stranded cables, comprise a plurality of buffer tubes or core tubes stranded helically about a central strength member. Periodically, the direction of the lay of the helical stranding is reversed. The locations where the helix lay reverses are known as switchbacks, and they provide points along the cable where the buffered optical fibers are not constrained by the helical configuration of the cable. Because the optical fibers are not constrained at the switchback, switchback locations are typically the points where mid-span splices can be easily made into the cable. Unfortunately, switchback locations are not readily observable because the strands of the cable are covered by a relatively thick, opaque polyethylene outer jacket.

Generally, ROL stranded cables are manufactured using at least a two step process. The first step of the two step process comprises forming a length of an unjacketed, ROL stranded buffer tube core with a reverse oscillating strander. Once the stranding process is completed, the ROL stranded cable core is usually taken up on a spool. Generally, in the second step, the spooled ROL stranded cable core is despooled and fed through an extruder where a protective polyethylene jacket is extruded over the stranded cable core. Those skilled in the art will appreciate that while the location of the switchbacks is known and readily observable prior to the extrusion process, the location becomes obscured once the relatively thick, opaque polyethylene jacket is placed over the stranded cable.

Section 5.2.3 of the Bellcore Generic Requirements for Fiber and Cable, No. TR-NWT-000020, Issue 5, December, 1992, sets forth an objective stating that "cables, containing multiple core or buffer tubes stranded using the reverse oscillating lay method, should indicate on the cable jacket the locations of the reversal midpoints." This general objective has been reiterated more specifically in Section 6.2.3 of the Bellcore Generic Requirements for Optical Fiber and Fiber Optic Cable, No. GR-20-CORE, Issue 1, September, 1994 wherein it states "cables containing stranded multiple core or buffer tubes using the reverse oscillation lay method should indicate the midpoints of the reversal length within +/− 150 mm (6 inches) on the outer cable jacket."

U.S. Pat. No. 4,828,352 discloses an ROL or S-Z stranded cable that appears to meet the objectives stated in Sections 5.2.3 and 6.2.3 described above. The outer jacket of the cable described therein has markings on the outer jacket identifying switchback locations. As shown by the several figures of the patent and according to the patent, the marking is desirable because it provides precise information about the location of switchbacks under the jacket to a craftsperson who may intend to make a splice into the cable in the field. Unfortunately for those skilled in the art of making such a cable, this patent does not provide any information as to how to provide such markings on the outer jacket during the cable manufacturing process so that the markings will be aligned with or "transversely co-extensive" with the switchbacks as called for in the patent claims.

A process for periodically marking the outer jacket of a cable is described in U.S. Pat. No. 4,880,484. The marking process of that patent generally comprises several steps. The first step calls for drawing a plurality of conductors in a longitudinal direction through an apparatus that affixes a plurality of magnetizable clamps along the length of the conductors. After the magnetizable clamps are affixed, a protective jacket of insulating material is applied about the conductors and magnetizable clamps affixed thereto. After jacketing, the outside of the protective jacket is marked in accordance with control signals generated by a sensing device that detects the presence of each of the magnetizable inserts through the jacket as the cable is drawn through the sensing device. While this patent is directed to periodically marking the jacket of a cable, the method of this patent, unlike the present invention, is unrelated to identifying and marking switchback locations of ROL stranded cables during the ROL cable manufacturing process. Furthermore, the process described in this patent could not be successfully employed with ROL optical fiber cables because the optical fibers cannot be subjected to the stresses induced by the magnetizable clamp.

In Japanese Pat. Publication JP 46-38748, published in 1971, a method for marking S-Z junctions in an alternatively reversible twisted cable is provided. The junctions are marked by neck portions to make it possible to immediately recognize the junctions without opening the outer sheath. The method utilizes a collector plate, whose rotation direction changes at a specific cycle in an alternately reversible direction to form the S-Z strands, to drive a slit formation pin to provide the neck portions connected to the outer sheath. The drawback with this process is that S-Z stranding to form the cable core and outer jacket extrusion must be accomplished on the same process line because the stranding process directly drives the marking process. However, in the ordinary practice of manufacturing S-Z optical fiber cables, the S-Z stranding process is done in a separate process line from the outer jacket extrusion process line. Thus, as stranding and jacketing are accomplished in separate process lines, it is impossible to directly pass, in real time, the reversible twisting information created by the S-Z stranding process to a marking device which is downstream of the outer jacket extruder in a different process line.

SUMMARY OF THE INVENTION

It is an object of the present invention to provide a method and apparatus for identifying a transition region (switchback) between a first lay orientation region and a second lay orientation region of a reverse oscillating lay cable core so that once the transition region is identified, the location of the transition region may be marked on the outer jacket of a finished cable.

It is another object of the present invention to provide a method and apparatus for providing marks on an outer jacket of an optical fiber cable to indicate the position of at least one cable element laying underneath the outer jacket.

It is an additional object of the present invention to provide a method and apparatus to mark the outer jackets of reverse oscillating lay cables so that they will meet the objectives set forth in Section 6.2.3 of the Generic Requirements for Optical Fiber and Fiber Optic Cable, No. GR-20-CORE, Issue 1, September, 1994.

The above stated objects are accomplished, at least in part, by a method for identifying a transition region between a first lay orientation region and a second lay orientation region of a cable core having a reverse oscillating lay. The method of identification comprises several steps, including: providing a reverse oscillating lay cable core comprising a plurality of conductors alternatingly arranged in a first lay orientation region, a second lay orientation region, and a transition region between the first lay orientation region and the second lay orientation region, and wherein at least one of the conductors of the plurality is visually distinguishable from the remaining conductors of the plurality; passing a portion of the cable core within a field of view of an imaging means; acquiring an image of the portion of cable core within the field of view of the imaging means; comparing the quantity of the visually distinguishable conductor in the acquired image to a reference value; and indicating that the portion of the cable core within the field of view of the imaging means contains a transition region if the quantity of visually distinguishable conductor in the acquired image exceeds the reference value.

The method for identifying a transition region can be incorporated into a method marking the outer sheath of a cable having a reverse oscillating lay cable core. Accordingly, in addition to the steps recited above for identifying a transition region, the method of marking a protective jacket or outer sheath comprises several additional steps, including: moving the portion of the cable core from the imaging means through an extruder wherein an outer jacket is extruded over the portion; moving the portion of the cable core from the extruder to a printing means; tracking the movement of the portion of cable core from the imaging means to the printing means; and providing a marking on the outer jacket with a marking device at a predetermined position on the jacket to identify the position of a transition region under the jacket if a transition region has been indicated for that portion.

Other objects and advantages of the present invention will become apparent and the invention will be more fully understood when reference is made to the following detailed description taken in conjunction with the accompanying drawings.

BRIEF DESCRIPTION OF THE DRAWINGS

The drawings, not drawn to scale, include:

FIG. 2, which is schematic diagram of an apparatus to carry out the method of the present invention for identifying transition regions of reverse oscillating lay cable cores and for providing markings on the outer jacket of a cable to indicate the location of transition regions thereunder;

FIG. 3, which is schematic diagram illustrating the arrangement of a camera and two mirrors to enable imaging of an entire cable core circumference to identify transition regions according to the method of the present invention;

FIG. 4A is a schematic diagram of the field of view of the camera of FIG. 3, when no transition region is present therein;

FIG. 4B is a schematic diagram of the field of view of the camera of FIG. 3, when a transition region is present therein;

FIG. 5 is a schematic diagram illustrating the arrangement of three cameras about a cable core to enable imaging of the entire cable core circumference to identify transition regions according to the method of the present invention;

FIG. 6 is a flow diagram illustrating the steps for identifying a transition region and for marking the outer jacket of a cable;

FIG. 7 is a schematic diagram of the apparatus of FIG. 2, illustrating shift register contents when a transition region has been identified; and FIG. 8 is a schematic diagram of the apparatus of FIG. 2, illustrating shift register contents causing the marking of the outer sheath.

DETAILED DESCRIPTION OF THE PRESENT INVENTION

Figure 1:
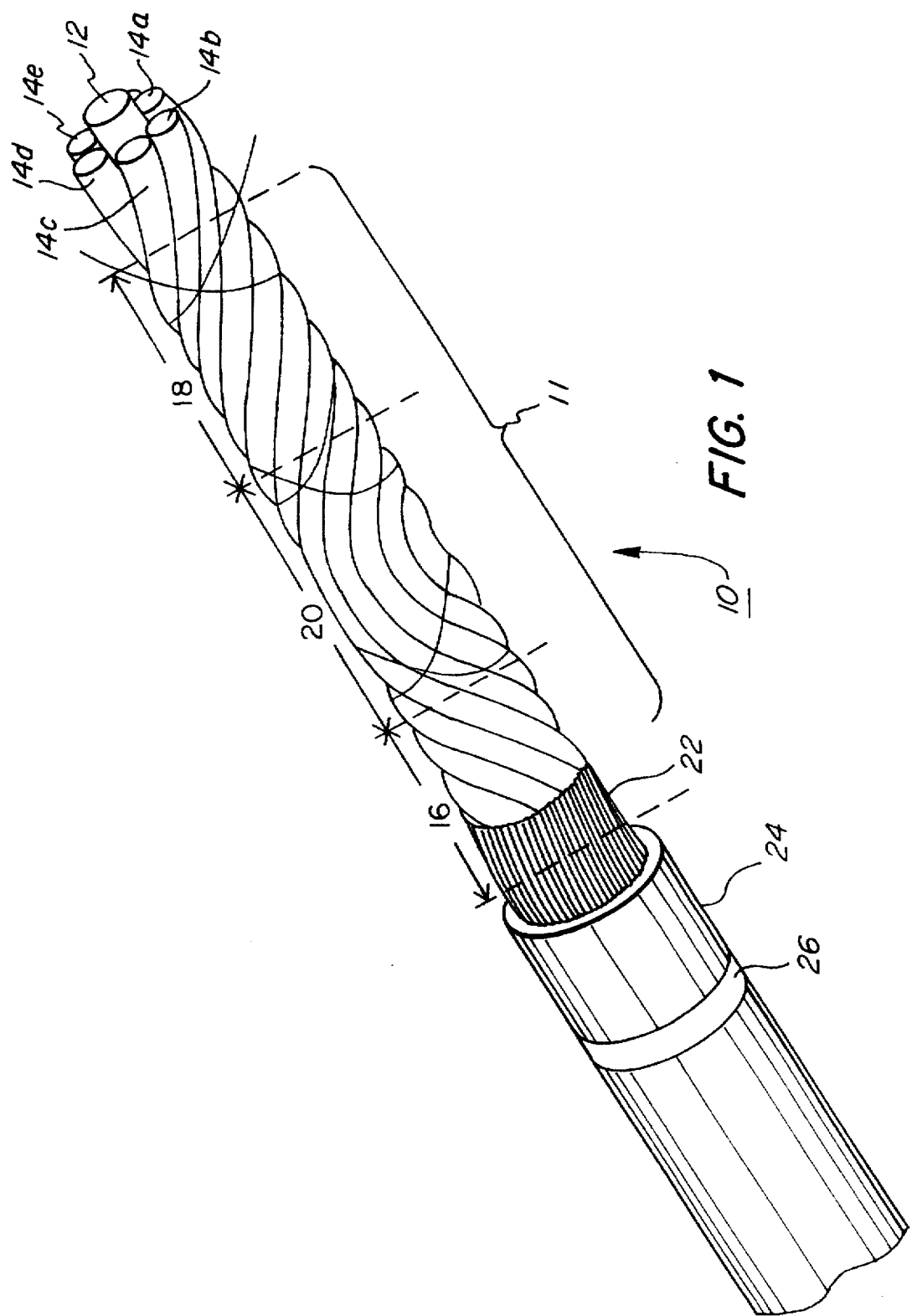
FIG. 1, which is a schematic diagram of a S-Z optical fiber cable.

As is well known by those skilled in the art, commercial reverse oscillating lay (ROL) cable, also sometimes referred to as S-Z stranded or alternately reversing stranded cable, contains a core having a plurality of conductors arranged in a reversing helical pattern. In optical fiber cables, such as loose tube designs or tight tube designs, the conductors are buffer tubes, each having at least one optical fiber therein. In some other optical fiber cable designs, such as slotted core designs, the optical fiber conductors may reside in the grooves of a core. In electrical cables, the conductors are typically insulated metallic wires. In pneumatic or hydraulic cables, the conductors are typically tubes through which water or air signals may pass. Those skilled in the art will appreciate that the present invention is applicable to any type of cable having a plurality of conductors that are arranged with S-Z stranding or in an alternately reversing helical manner. Those skilled in the art will also appreciate that the present invention is also applicable to any strand-like material which is covered by an outer jacket.

Referring to FIG. 1, a typical S-Z stranded or ROL cable 10 usually contains a cable core 11 comprising a central strength member 12 and a plurality of buffer tubes 14a–14e. The buffer tubes 14a–14e usually contain one or more optical fibers (not shown). Typically, each of the buffer tubes of the plurality in a commercial S-Z stranded optical fiber cable is distinctively colored for identification purposes. For the purposes of practicing the method of the present invention, only one of the plurality of buffer tubes needs to be visually distinguishable from the remainder, and color need not be the feature that makes the conductor visually distinguishable.

In the S-Z stranded cable core 11, the plurality of buffer tubes 14a–14e are arranged about the central strength member 12 so as to have a first lay orientation region 16, a second lay orientation region 18 and a transition region 20 therebetween in which the lay of the plurality of buffer tubes reversibly changes from a first orientation, such as a clockwise rotation, to a second orientation, such as a counterclockwise rotation. S-Z stranded cables may also have armor 22 to protect the cable core and may also have other materials to hold the cable core together such as yarns and tapes (not shown). S-Z stranded cables usually have an opaque outer jacket 24 which surrounds the cable core and other materials such as the armoring, yarns or tapes. It is known by those skilled in the art that the S-Z stranding pattern allows the cable to have an excess or over-length of fiber which is useful to reduce induced stresses in the cable caused, for example, by thermal expansion and contraction of the cable. It is also known by those skilled in the art that the transition regions in S-Z stranding also provide sufficient excess fiber to allow for enough slack to unwind the fibers in the helical sections to permit mid-span splices or branches to be made, when necessary. As those skilled in the art will readily appreciate, the outer jacket 24 of the cable 10 hides the S-Z stranding arrangement, thereby making it difficult, if not impossible, to determine where transition regions 20 are located in a cable prior to cutting the opaque outer jacket 24. Therefore, as set forth in the Bellcore Generic Requirements Section 6.2.3, it is desirable to apply a marking 26 to the outer jacket 24 to indicate the location of the transition regions 20.

Ordinarily, S-Z stranded cables are manufactured using multi-step processes. Typically, in one or more steps, a cable core, which comprises the central strength member 12, if the cable has one, and the plurality of buffer tubes 14a–14e, is produced. As the cable core is completed, it is stored on a spool. The spool of core is transferred to an outer jacketing process line. In the outer jacketing process, the outer jacket 24 is extruded over the core comprising the central strength member 12 and the plurality of buffer tubes 14a–14e. The resulting cable is taken upon another spool.

THE APPARATUS

Referring to FIGS. 2 and 3, there is shown a schematic illustration of an apparatus 30 which may carry out the method of the present invention and produce an S-Z stranded optical fiber cable from a typical S-Z stranded cable core in compliance with the objective set forth in Section 6.2.3 of the Generic Requirements for Optical Fiber and Fiber Optic Cable, No. GR-20-CORE. Generally, the apparatus 30 can be utilized to identify transition regions 20 which are located between a first lay orientation region 16 and a second lay orientation region 18 of a reverse oscillating lay or S-Z cable core as well as apply a marking to an outer jacket or sheath, extruded over the core, in any desired location relative to the transition region to indicate the position of the transition region thereunder.

More specifically, the preferred embodiment of the apparatus comprises a take-off spool 32 which contains a length of typical S-Z stranded cable core 11 having the plurality of buffer tubes 14a–14e as illustrated in FIG. 1. The apparatus 30 further includes an extruder 34 wherein the outer jacket 24 is extruded over the core 11 to form completed cable 10. The apparatus 30 also includes a take-up spool 36 which gathers the completed cable 10.

An Allen Bradley model 2801-YJC camera 40 is disposed between the take-off spool 32 and the extruder 34. The camera 40 is directed so as to have a field of view towards the cable core 11. A pair of mirrors 41a and 41b are arranged at 45° degree angles below the cable core 11 so as to enable the field of view of the camera 40 to see the entire circumference of the cable core 11. Alternatively, as illustrated in FIG. 5, instead of a single camera 40 and mirrors 41a and 41b, three cameras, 43a, 43b and 43c can be used to view the entire circumference of the cable core 12.

The camera 40 is connected to a vision inspection/image acquisition system 42 comprising an Allen Bradley color VIM processor and an Allen Bradley model 2801-N28 input/output module. The input section of the acquisition system's 42 input/output module is connected to the camera 40 via line 44.

The apparatus 30 also has a controller 46 which includes an Allen Bradley SLC 5/03 processor containing a bit shift register, a 24 VDC Allen Bradley 1746-IB16 input module, an Allen Bradley 1746-OB16 24 VDC output module, and an Allen Bradley 1747-very high speed counter (VHSC) input module. The input module of the controller 46 is connected to the output module of the acquisition system 42 via line 48.

A position encoder 50 is disposed, in contact with the cable 10, between the extruder 34 and the take-up spool 36. The position encoder 50 is connected to the high speed counter input module of the controller 46 via line 52.

A marking device 54, such as an ink jet printer is disposed adjacent to the cable 10 and between the position encoder 50 and the take-up spool 36. The marking device 54 is connected to the 24 VDC output module of the control processor 46 via line 56.

THE METHOD

The method of the present invention, which may employ the apparatus illustrated in FIGS. 2 and 3, is illustrated in the flow diagram of FIG. 6. The schematic diagrams of FIGS. 7 and 8 illustrate the state of the apparatus, particularly the state of the bit shift register 60, during operation according to the method of the present invention.

Referring to FIGS. 2 and 3, and 6 through 8, according to the method of the present invention, after starting the apparatus (step 100), addresses $R_1$ through $R_n$ in the bit shift register 60 in the controller 46 are set to zero. Following this initialization step, camera 40 acquires an image (step 104), from its field of view, of portion $P_1$ of the cable core 11. The image of portion $P_1$ acquired by the camera 40 is provided to the vision inspection/image acquisition system 42 via line 44. The amount of visually distinguishable conductor in the image of portion $P_1$ is measured (step 106) and compared (step 108) by the acquisition system 42 to a predetermined threshold to determine whether or not the quantity of the visually distinguishable conductor 14c, for example, in portion $P_1$ exceeds the predetermined threshold. The acquisition and comparison described above is repeated for each portion of the cable core, $P_2$, $P_3$, $P_4$, etc., in a sequential manner.

FIGS. 4A and 4B illustrate the field of view 15 of camera 40. In FIG. 4A, a minimal amount of visually distinguishable buffer tube 14c is present in the field of view. This field of view is representative for portions $P_2$ and $P_4$ in FIGS. 7 and 8. In FIG. 4B, a maximum amount of visually distinguishable buffer tube 14c is present in the field of view 15. This field of view is representative of portions $P_1$ and $P_3$ where a transition 20 is present.

Whenever the acquisition system 42 determines that the threshold has been exceeded in a portion of the cable (step 110), a signal is fed to the controller 46. The controller places a "1" in the first address $R_1$ of the bit shift register 60 to indicate the presence as well as the virtual position of a detected transition region 20 adjacent to, and in the field of view of, the camera 40. If the threshold is not exceeded (step 112), the register address $R_1$ is set to "0". As those skilled in the art will appreciate, each of the addresses $R_1$ through $R_n$ corresponds to a location between the camera 40 and the marking device 54.

As the cable core moves down line from a position adjacent to the camera 40, pulse signals from the position encoder 50 cause the "1" in bit shift register address $R_1$ to correspondingly shift to register addresses $R_2$, $R_3$, $R_4$ and so on until the "1" corresponding to portion $P_3$ reaches address $R_n$ in the bit shift register (step 114) when portion $P_3$ is adjacent to marking device 54. Each time the contents of the shift register are shifted, the content of register address $R_n$ is read (step 116) and the value thereof analyzed to determine whether it is equal to "1" (step 118). If the value of register $R_n$ is equal to "1", then the controller 46 sends a signal to marking device 54, via line 56, to cause a marking 26 to be applied to the outer jacket which has been extruded over the core to form finished cable 10 (step 120). The finished cable 10, having markings 26, is taken up on spool 36.

While the method and apparatus of the present invention is particularly useful for marking the location of switchbacks on the outer jacket of an ROL or S-Z stranded cable, those skilled in the art should appreciate that the invention can be used to identify a region of interest in a strand-like material having at least two identifiable regions. The method and apparatus of the present invention may also be employed to supply information about the location of the region of interest so that an exterior covering may be marked. Also, the method and apparatus of the present invention can be easily adapted to mark slotted core ROL cables.

The embodiments of the present invention disclosed herein admirably achieve the objects set forth; however, it should be appreciated by those skilled in the art that departures can be made by those skilled in the art without departing from the spirit and scope of the invention which is limited only by the following claims.

What is claimed is:

1. A method for identifying a transition region between a first lay orientation region and a second lay orientation region of a cable core having a reverse oscillating lay, the method comprising the steps of:
    (a) providing a reverse oscillating lay cable core comprising a plurality of conductors alternatingly arranged in a first lay orientation region, a second lay orientation region, and a transition region between the first lay orientation region and the second lay orientation region, and wherein at least one of the conductors of the plurality is visually distinguishable from the remaining conductors of the plurality;
    (b) passing a portion of the cable core within a field of view of an imaging means;
    (c) acquiring an image of the portion of cable core within the field of view of the imaging means;
    (d) comparing the quantity of visually distinguishable conductor in the acquired image to a reference value; and
    (e) indicating that the portion of the cable core within the field of view of the imaging means contains a transition region if the quantity of visually distinguishable conductor in the acquired image exceeds the reference value.

2. An apparatus for indicating the presence of a transition region between a first lay orientation region and a second lay orientation region of a cable core having a reverse oscillating lay, the apparatus comprising:
    (a) means for providing a reverse oscillating lay cable core comprising a plurality of conductors alternatingly arranged in a first lay orientation region, a second lay orientation region, and a transition region between the first lay orientation region and the second lay orientation region, and wherein at least one of the conductors of the plurality is visually distinguishable from the remaining conductors of the plurality;
    (b) means for imaging a portion of the cable core, the means having a field of view;
    (c) means for passing a portion of the cable core within a field of view of the imaging means;
    (d) means, responsive to the imaging means, for acquiring an image of the portion of cable core within the field of view of the imaging device;
    (e) means, responsive to the image acquiring means, for comparing the quantity of visually distinguishable conductors in the acquired image to a reference value; and
    (f) means, responsive to the comparison means, for indicating that a transition region is within the field of view of the imaging means if the quantity of visually distinguishable conductors in the acquired image exceeds the reference value.

3. The apparatus of claim 2, wherein the means for imaging a portion of the cable core comprises a camera.

4. The apparatus of claim 2, wherein the means for imaging a portion of the cable core includes means for imaging the entire circumference of the cable core portion.

5. The apparatus of claim 2, wherein the means for imaging a portion of the cable core comprises a camera, and a plurality of reflective members positioned relative to the cable core and the camera so as to be within the field of view of the camera and to provide an image of the cable core in the field of view of the camera.

6. The apparatus of claim 2, wherein the means for imaging a portion of the cable core comprises a plurality of cameras positioned about the cable core portion.

7. The apparatus of claim 2, wherein the means for imaging a portion of the cable core comprises a plurality of cameras equally positioned about the cable core portion.

8. A method for providing a marking on a protective jacket surrounding a reverse oscillating lay cable core to indicate a transition region between a first lay orientation region and a second lay orientation region, the method comprising the steps of:
    (a) providing a reverse oscillating lay cable core comprising a plurality of conductors alternatingly arranged in a first lay orientation region, a second lay orientation region, and a transition region between the first lay orientation region and the second lay orientation region, and wherein at least one of the conductors of the plurality is visually distinguishable from the remaining conductors of the plurality;
    (b) passing a portion of the cable core within a field of view of an imaging means;
    (c) acquiring an image of the portion of cable core within the field of view of the imaging means;
    (d) comparing the quantity of visually distinguishable conductors in the acquired image to a reference value;
    (e) indicating that the portion of the cable core within the field of view of the imaging means contains a transition region if the quantity of visually distinguishable conductors in the acquired image exceeds the reference value;
    (f) moving the portion of the cable core from the imaging means through an extruder wherein an outer jacket is extruded over the portion;
    (g) moving the portion of the cable core from the extruder to a printing means;
    (h) tracking the movement of the portion of cable core from the imaging means to the printing means; and
    (i) providing a marking on the outer jacket with a marking device at a predetermined position on the jacket to identify the position of a transition region under the jacket if a transition region has been indicated in step (e) for that portion.

9. An apparatus for providing a marking on a protective jacket surrounding a reverse oscillating lay cable core to indicate a transition region between a first lay orientation region and a second lay orientation region, the method comprising the steps of:

(a) means for providing a reverse oscillating lay cable core comprising a plurality of conductors alternatingly arranged in a first lay orientation region, a second lay orientation region, and a transition region between the first lay orientation region and the second lay orientation region, and wherein at least one of the conductors of the plurality is visually distinguishable from the remaining conductors of the plurality;

(b) means for imaging a portion of the cable core, the means having a field of view;

(c) means for passing a portion of the cable core within the field of view of the imaging means;

(d) means for acquiring an image of the portion of cable core within the field of view of the imaging means;

(e) means, responsive to the image acquiring means, for comparing the quantity of visually distinguishable conductors in the acquired image to a reference value;

(f) means, responsive to the determining means, for indicating a transition region if the quantity of visually distinguishable conductors in the acquired image exceeds the reference value;

(g) means, responsive to the indicating means, for tracking the movement of the portion of cable core containing a transition region, as indicated in step (e), downstream from the field of view of the imaging means; and (h) means, responsive to the tracking means, for providing a marking on an outer jacket at a predetermined position on the jacket to identify the position of a transition region under the jacket as indicated in step (e).

10. The apparatus of claim 9, wherein the means for imaging a portion of the cable core comprises a camera.

11. The apparatus of claim 9, wherein the means for imaging a portion of the cable core includes means for imaging the entire circumference of the cable core portion.

12. The apparatus of claim 9, wherein the means for imaging a portion of the cable core comprises a camera, and a plurality of reflective members positioned relative to the cable core and the camera so as to be within the field of view of the camera and to provide an image of the cable core in the field of view of the camera.

13. The apparatus of claim 9, wherein the means for imaging a portion of the cable core comprises a plurality of cameras positioned about the cable core portion.

14. The apparatus of claim 9, wherein the means for imaging a portion of the cable core comprises a plurality of cameras equally positioned about the cable core portion.

* * * * *